United States Patent Office 3,202,604
Patented Aug. 24, 1965

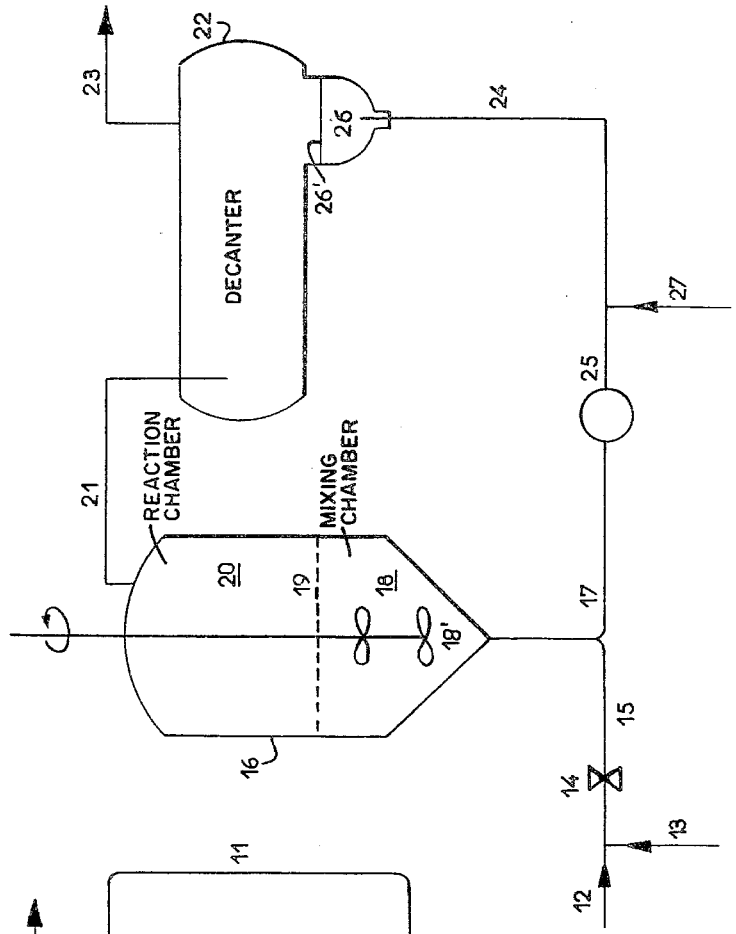

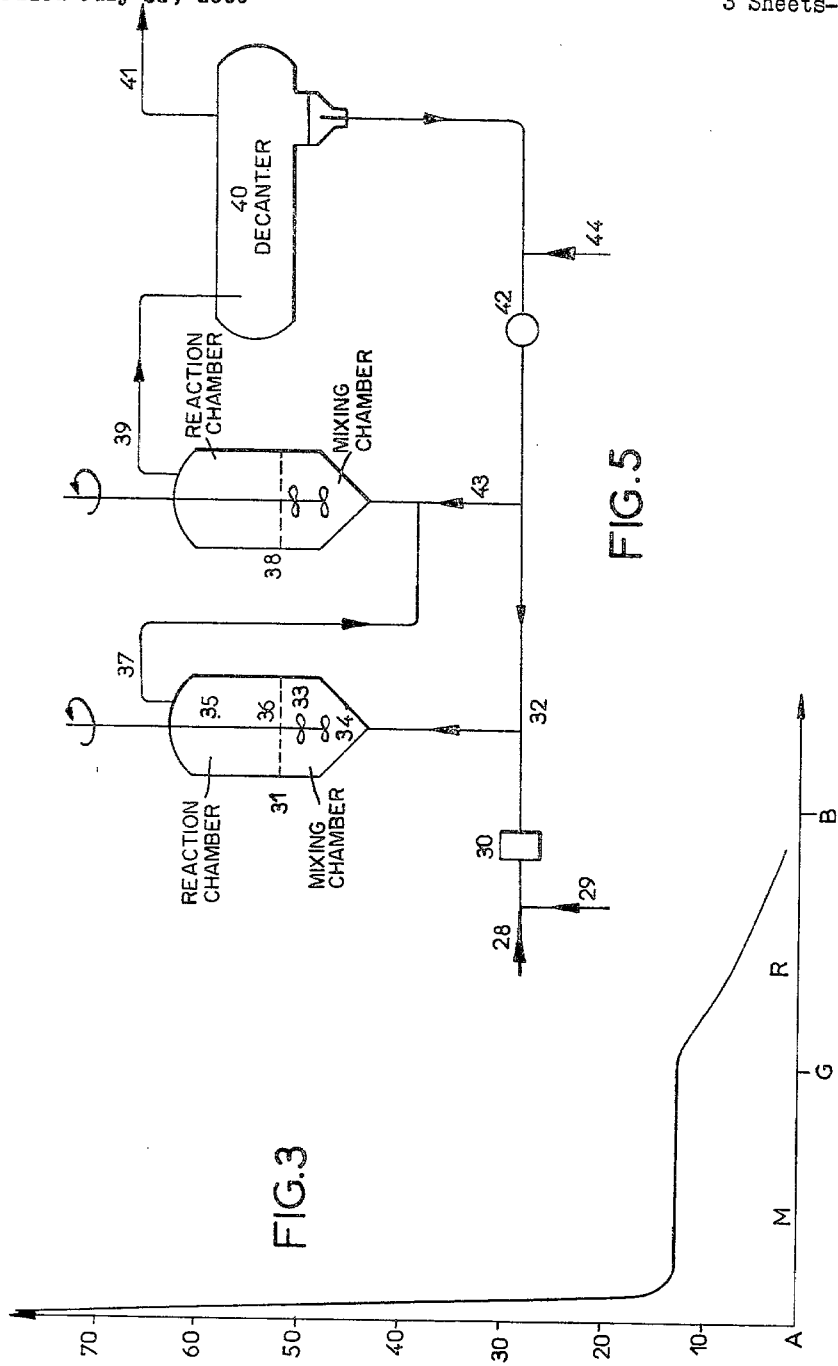

3,202,604
SWEETENING PETROLEUM PRODUCTS
Edouard Weisang, Le Havre, and André Marie Valet, Fontenay-aux-Roses, France, assignors to Société Anonyme dite: Compagnie Francaise de Raffinage, Paris, France, a French corporation
Filed July 11, 1960, Ser. No. 42,133
3 Claims. (Cl. 208—204)

This invention relates to the "sweetening" of petroleum hydrocarbons by the catalytic oxidation of such substances as mercaptans therein in the presence of an oxidation catalyst, and, more particularly, to the continuous sweetening treatment of such petroleum hydrocarbons with an oxygen-containing gas in the presence of an aqueous alkaline phase and a solid oxidation catalyst which is insoluble in said petroleum hydrocarbons.

Even if it be recognized that a wide variety of processes are known or available for the "sweetening" of petroleum hydrocarbons by the oxidation of mercaptans therein in the presence of an oxidation catalyst, some difficulty may be experienced in converting some or all of such processes to a continuous throughput operation, instead of a batch type operation, and particularly if it is desired to incorporate into the continuity of the commercial arrangement a step or time or opportunity for the regeneration of the oxidation catalyst material before the recycling thereof through a subsequent quantity of hydrocarbons to be sweetened. Particularly may such difficulties be apparent in connection with the use as an oxidation catalyst of a material which is solid or immiscible in the hydrocarbons to be sweetened, and even more emphatically if such oxidation catalyst becomes wholly or partially soluble in an aqueous phase in the system as, for example, after having been catalytically involved in the desired sweetening oxidation reaction.

Thus, as particularly illustrative of the foregoing, is the situation which may be experienced when sulfur dyes are utilized as oxidation catalysts for the oxidation of mercaptans contained in a hydrocarbon mixture in the presence of air or other oxygen-containing gas to produce disulfides and, particularly, with an aqueous alkaline phase inherently immiscible with the hydrocarbons to be treated. One may note the possibility that the catalytic action of such sulfur dyes in the desired oxidation process may reside in the fact that such dyes are reduceable to a "leuco" form by alkaline mercaptides, that this leuco form may then be oxidized for regenerating the catalyst in its active state, and that such sulfur dyes in the oxidized form are substantially as insoluble in the hydrocarbon phase as in the aqueous phase, while the leuco form is soluble in the aqueous phase. With such dyes as a catalyst in such a process, particularly a continuous process, the catalyst may exist partially dissolved in the aqueous phase and partially in dispersed insoluble state, yet it will be understood that the active fraction capable of providing the desired catalytic action for oxidizing mercaptans is to be found as the dispersed insoluble portion of the dye distribution in its two forms in the two phases.

Sweetening processes of the general character to which thi invention relates may be noted as illustrated by those disclosed in U.S. Patent No. 2,897,140 and in the copending application Serial No. 800,454, filed March 19, 1959, now U.S. Patent No. 3,038,855. As will be understood in connection with such types of sweetening processes, an intimate intermixture and contact with the hydrocarbons to be treated with the alkaline aqueous washing solution phase and the catalyst is desired, and even with a gaseous phase containing oxygen if needed by the amount of mercaptans to be oxidized. It is, however, in attempting to work out a continuous process with such sweetening operations, including continuous regeneration of the catalyst for re-use, that some difficulty may be experienced. It has been determined, for example, that violent agitation of the hydrocarbons to be sweetened and the alkaline reactant phase does not, with continuous processes, produce optimum reaction efficiency, however much it may enhance the intimate contact among the phases.

According to this invention, however, there is provided for such a continuous sweetening process with a catalyst which is insoluble in one or both of the aqueous and hydrocarbon phases, as well as for continuous regeneration of the catalyst itself, and with continuous treatment whereby agitation or mixing is provided in one step for contact of the ingredients or reactants, while thereafter a reaction zone is provided with only enough agitation to keep the immiscible phases from separating, and thereafter a final zone for separating the treated hydrocarbon phase from the immiscible aqueous phase containing the catalyst for recycling the latter.

With the foregoing objects in view, this invention will now be described in somewhat more detail, and other objects and advantages of this invention will become apparent from the following description, the accompanying drawings, and the appended claims.

In the drawings:

FIG. 1 is a schematic flow sheet type of representation of the several steps and elements of apparatus embodying and for practicing this invention;

FIG. 2 is a somewhat diagrammatic view setting forth one arrangement of apparatus embodying and for practicing this invention;

FIG. 3 is a graph illustrating amounts of retained sulfur (as mercaptan) in the reaction mixture at various points in the sequence of steps in a process embodying and for practicing this invention; and FIGS. 4 and 5 are diagrammatic representations of further arrangements of apparatus embodying and for practicing this invention.

Figure 4:
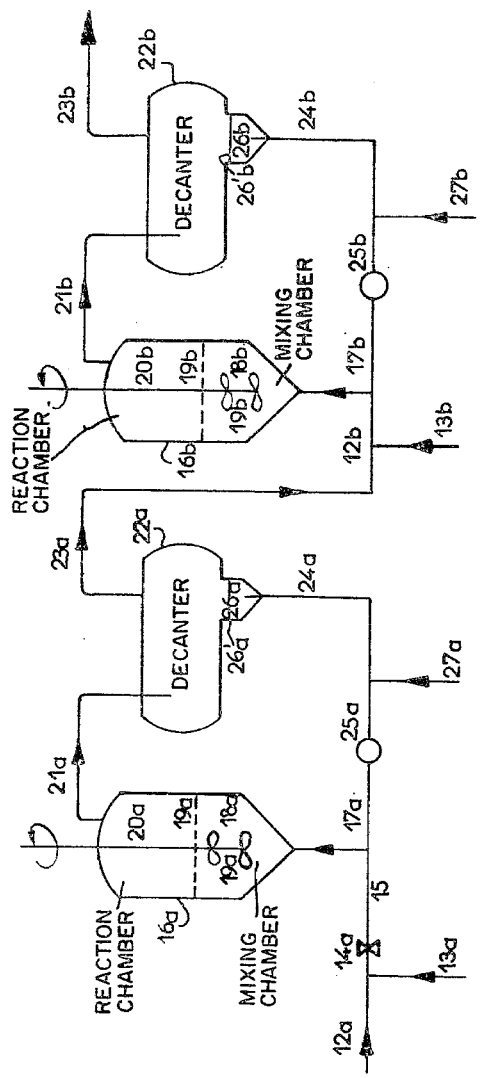

Referring to the drawing, and particularly the flow sheet representation of FIG. 1, it may be noted that the hydrocarbons to be treated is supplied at 1, are saturated with air, supplied at 2, in a saturator 3 in known manner, whence the aerated hydrocarbon is directed to a mixing zone 4 in which it is mixed with substantial agitation with the aqueous alkaline reactant or washing solution phase arriving at 5, containing therein a dispersion of the catalyst in at least partially oxidized form, and hence, insoluble in either the aqueous or the hydrocarbon phase.

After intermixing the aqueous and hydrocarbon phases (the latter of which contains air for the oxidation step and the former of which contains the dispersed oxidation catalyst) in mixing zone 4, the admixture of the fluid and solid phases pass into a reaction zone 6 where it is retained for sufficient time for the oxidation reaction to be effected (for example 4–50 minutes, depending upon the concentration of sulfur compounds to be oxidized, the temperature, etc.). Although violent agitation is not desired during this reaction time in reaction zone 6, it is necessary to avoid complete separation of the aqueous and hydrocarbon and solid phases, which separation would deter, as will be understood, the oxidation reaction by interfering with or limiting intimate contact of the hydrocarbon to be treated with the alkaline aqueous solution and the catalyst therein.

As one means or system for effecting this mild agitation in mixing zone 6 to an extent sufficient to prevent separation of the phases therein and yet not so violently as to impair the reaction efficiency in accordance with this invention, satisfactory results are achieved if the continuous flow of material through mixing zone 6 has a linear ascending speed or flow rate sufficient to prevent settling or decantation, for example, at least about 0.05 cm./sec.

After reaction in reaction zone 6, the reaction mixture is led to a decantation or separation zone indicated at 7 where the treated hydrocarbons are separated from the aqueous alkaline phase and from the catalyst. In separating or decanting zone 7, contrary to the desired condition in reaction zone 6, the flow rate or speed of the materials is reduced to less than about 0.05 cm./sec. in order to enhance decantation or gravity separation of the hydrocarbon phase from the aqueous phase. Preferably, the decantation zone 7 should be essentially a simple and open decanter without being filled with packing and the like on the surface of which there might be encouraged the accumulation or deposition of the dispersed catalyst, and the absence of such packing is desired notwithstanding the fact that decantation might be aided by such packing because it is preferred to maintain the catalyst dispersed and/or dissolved in the aqueous phase for recycling in accordance herewith.

As noted in the flow-sheet of FIG. 1, the treated hydrocarbons are withdrawn from the separation zone 7 as to 8, while the aqueous alkaline reactant with some catalyst dissolved or dispersed therein is withdrawn at 9 for recycling through line 5 into mixer 4 for treatment of a subsequent quantity of hydrocarbon. Preferably a further outlet from separation zone 7, indicated at 11, is disposed generally in the area of the interface 10 between hydrocarbon and aqueous phases where a greater concentration of catalyst may be withdrawn for recycling because, as it has been found, the dispersed catalyst tends to separate preferentially at the interface between the hydrocarbon and aqueous phases.

Referring to FIG. 2, there is suggested diagrammatically an assemblage of apparatus for implementing the foregoing process steps embodying and for practicing this invention. Thus, the hydrocarbons to be treated, preferably having been pre-washed by well known means, are introduced into the apparatus at inlet 12 thereof, while air (or other oxygen-containing gas) is introduced at 13 for aeration and intimate admixture with the hydrocarbons as, for example, in a conventional mixer or fritted metal diffuser indicated at 14. The oxygen-hydrocarbon mixture is then led through piping 15 into the bottom of a reaction vessel 16, while there is simultaneously introduced into reactor 16 through piping 17 an aqueous alkaline reactant solution such as, for example, an aqueous solution of 35% potassium hydroxide containing a dispersion of 20–100 gm. per litre of sulfur dye as the oxidation catalyst.

In the embodiment shown in FIG. 2, as will be noted, the mixing zone and reaction zone previously mentioned (at 4 and 6 in FIG. 1) are here shown as combined within the single reaction vessel 16, although reactor 16 is separated transversely by a foraminous partition 19 dividing it into a lower chamber 18 and an upper chamber 20, which chambers correspond, respectively, to the mixing zone 4 and the reaction zone 6 mentioned above. The diameters of the orifices in foraminous partition 19 are satisfactorily within the range of from 1–10 cm. and, particularly, such that the flow rate or linear speed of the liquid mixture passing upwardly through foraminous partition 19 is approximately of the order of 0.5–1 cm./sec., which upward flow, as will be understood, is to be induced by an agitator in chamber 18 and indicated generally at 18′.

Thus, in lower chamber 18 of reactor 16, agitator 18′ mixes the hydrocarbon and aqueous phases, including the catalyst, with a substantially violent agitation and, thereby, induces the upward flow of the intermixed materials through the orifices in partition 19 and into the upper chamber 20 of reactor 16 for reaction therein. As merely illustrative, satisfactory results are achieved if the capacity of agitators 18′ is such as to handle or move a volume of liquid per minute of approximately 3–9 times the volume of lower chamber 18.

In the foregoing embodiment, as noted, the upper chamber 20 above foraminous partition 19 constitutes the reaction zone previously mentioned where the oxidation reaction occurs. Since upward movement through chamber 20 and to the ultimate outlet 21 thereof is induced primarily by agitators in lower chamber 18 and since the process here is of a continuous nature, it is desired to maintain sufficient agitation in upper chamber 20 to avoid decantation or separation of the aqueous and hydrocarbon phases, without, however, having such an amount of agitation as will intermix treated or reacted hydrocarbon adjacent the top of chamber 20 with newly entering hydrocarbon adjacent partition 19. In accordance herewith, then, satisfactory results are achieved if the ascending speed or flow rate of the materials above partition 19 is maintained within the ranges of approximately 0.05–0.25 cm./sec., such maintenance being effected by the correlation of the speed and capacity of agitators 18′ as well as by the orifice sizes of the perforations in foraminous partition 19.

As illustrative of the enhanced results and operation of this invention, one may note, for example, the treatment of a quantity of pre-washed gasoline containing, originally, about 0.008% sulfur in the form of mercaptan in accordance with the foregoing description of steps and apparatus embodying and for practicing this invention. In this particular case, the apparatus was dimensioned and operated to obtain an intermixing contact time of about ten minutes in the mixing or agitation zone and about an additional ten minutes in the reaction zone.

Under such conditions of operation, the measurable mercaptan content was reduced in accordance with the data plotted in the graph of FIG. 3. That is, in interpreting this graph, the amounts of retained sulfur (as gm./m.$^3$ of $S_{RSH}$—i.e., as mercaptan) are shown on the ordinant, while indicated on the abscissa are the various points in the system at which the sulfur or mercaptan determinations were made. Thus, the points A and B correspond respectively, to the entrance and exit of hydrocarbon to and from the treating reactor 16, M indicates the material in the mixing or agitation zone, G indicates the material at the foraminous partition 19 between mixing zone 18 and reaction zone 20, and R corresponds to the concentration at the vertical mid-level of the reaction zone 20. As will be noted from FIG. 3, these data may be summarized as follows:

*Table I*

| Location of measurement: | Gm./m.$^3$ ($S_{RSH}$) |
|---|---|
| Entering the apparatus | 80 |
| In mixing zone (M) | 12 |
| At partition 19 (G) | 12 |
| Mid-height reaction zone (R) | 5 |
| Leaving reaction vessel (B) | Sweet |

The mixture of hydrocarbon and aqueous phase of alkaline washing solution and solid catalyst, the separation or decantation of which was avoided in reactor 16 because of the maintained flow rate or ascending speed thereof, is withdrawn at the top of chamber 20 of reactor 16 as through piping 21, and is led to a horizontal decanter 22. Preferably, decanter 22 is free of packing material and of a volume to produce a decantation or holding time, for the throughput of the system, of about 15–30 minutes. Preferably, also, the decanter 22 is of the well known horizontal variety for reducing the flow speed or agitation of the mixture of phases introduced thereinto to promote the decantation or gravity separation of hydrocarbon and aqueous phase.

After resting in or slowly flowing through decanter 22 with separation of the phases, the treated and refined sweet hydrocarbon phase is withdrawn at the upper portion of decanter 22 as at 23, while the aqueous phase of alkaline washing solution and containing dispersed catalyst is withdrawn through the piping 24 as under the action of a pump indicated at 25 permitting the regulation and control of the separating phases in decanter 22. As indicated in the drawing, a constricted sump 26 is preferably provided in decanter 22 to aid in the control of withdrawal of material from the decanter 22 to aid in the control of withdrawal of material from the decanter, and the throughput of the apparatus is adjusted to maintain the interface between aqueous and hydrocarbon phases generally as indicated at 26'.

Also under the action of pump 25, the withdrawn aqueous phase including dispersed catalyst is, then, recycled through line 17 for admixture with a subsequent quantity of aerated hydrocarbon to be treated with make-up catalyst being added or replenished, as required, at 27 to compensate for catalyst and aqueous phase losses which may be experienced.

Under certain circumstances, it may be preferred to accomplish a sweetening process in accordance herewith in a plurality of mixing and reaction and decantation stages for enhanced efficiency and/or to accommodate a desired throughput rate of total product treated and/or to accommodate more satisfactorily the sizes and volumes of the various elements of the apparatus, as will be understood in accordance with well known chemical engineering processing considerations. As illustrative, there is diagrammed in FIG. 4 a 2-stage treatment with apparatus generally as indicated in FIG. 2.

In FIG. 4, the various elements of apparatus are designated by the same reference numerals as the corresponding elements in FIG. 2, with those elements for the first treatment stage having the letter *a* appended to the reference numeral and with the letter *b* appended to the same reference numerals to indicate those of the apparatus elements for the second stage of treatment. As will be understood from the foregoing, the hydrocarbon phase and aqueous and catalyst phases are contacted and intermixed and decanted, in accordance with the foregoing, in a first stage of treatment, from which the treated hydrocarbon exits through piping 23a and, thereafter, enters the second stage of treatment at 12b for additional sweetening, with the finally completely treated and sweet product exiting from the apparatus through outlet 23b from decanter 22b.

A further modification or embodiment of apparatus for practicing this invention is diagrammatically illustrated in FIG. 5, in which a single decanting apparatus is utilized for receiving the treated product from a plurality of reaction vessels. In this form, hydrocarbons to be refined and/or sweetened are introduced into the apparatus at 28 and are saturated with air or oxygen introduced at 29 in the mixer or saturator 30. The aerated hydrocarbon mixture enters a reaction vessel 31 through piping through which an aqueous alkaline washing solution containing dispersed catalyst is also introduced at 32.

The reaction vessel 31 is similar to those described above, and includes a mixing zone 33, where the intimate contact or admixture of the aqueous and hydrocarbon phases is achieved by agitator 34. Reactor 31 also includes an upper reaction zone 35, separated from mixing zone 33 by a foraminous partition 36. In this apparatus, as previously described, the respective volumes of the chambers of reacting vessel 31 and the orifice sizes of the perforations in foraminous partition 36 and the capacity in operation of agitators 34 are all correlated to provide a fluid movement of the admixed phases upwardly through partition 36 so as to prevent decantation or separation of the immiscible phases in the reaction zone 35 while, at the same time, avoiding such violent agitation as would induce intermixture of entering hydrocarbon adjacent partition 36 with treated hydrocarbon in the upper levels of chamber 35 and adjacent outlet 37 thereof.

After a dwell time, as desired, in reactor 31, the thus treated hydrocarbon is withdrawn at outlet 37 thereof and led to a subsequent and/or second-stage reactor 38, substantially identical with reactor 31, into which it is pumped as admixed with additional aqueous alkaline washing liquor and catalyst supplied through piping 43 for a further and substantially similar or identical second-stage sweetening treatment. The hydrocarbon mixture, after completion of the second-stage treatment and desired contact or dwell time in the upper portion of reactor 38, is withdrawn therefrom at the outlet 39 and led to a decanting vessel 40 where the flow rate of the mixture is sufficiently slowed to permit decantation and gravity separation of the hydrocarbon phase and the catalyst-containing aqueous washing liquid phase as previously described. The treated hydrocarbon is withdrawn at 41 from decanter 40, while the aqueous phase is withdrawn, as previously described, from the sump thereof and urged, as by pump 42, to be recirculated with subsequent or additional quantities of hydrocarbons to reaction vessels 31 and 38, as shown, with addition of makeup aqueous phase and/or catalyst being provided at 44 to compensate for normal losses in use.

As will be seen by the foregoing, there is provided by this invention teachings of a method and combination of apparatus elements embodying and for practicing a continuous "sweetening" process for liquid hydrocarbons wherein the sulfur compounds therein are oxidized and removed with an immiscible aqueous phase which includes an oxidation catalyst insoluble or immiscible with one or both the liquid hydrocarbon and the aqueous phase, and providing for such "sweetening" refining or treatment in continuous flow manner with enhanced reaction and apparatus efficiency, as by controlling the extent or degree of agitation or flow rate of the various phases through the various zones or portions of the process or apparatus.

Although specific embodiments have been shown and described, it is to be understood that they are illustrative and are not to be construed as limiting on the scope and spirit of the invention.

What is claimed is:

1. In a method for the continuous flow treatment of a liquid hydrocarbon phase with an aqueous alkaline phase immiscible therewith and including a dispersed oxidation catalyst insoluble in both said aqueous phase and said hydrocarbon phase for the oxidation and removal of sulfur compounds in said liquid hydrocarbons, the steps which comprise continuously introducing said liquid hydrocarbon phase and said aqueous phase with said insoluble catalyst dispersed therein into a mixing zone, subjecting said liquid hydrocarbon and aqueous phase to agitation in said mixing zone for the intimate dispersal and intermixture thereof, continuously withdrawing said mixture, and dispersion from said mixing zone into a reaction zone having an inlet end and an outlet end, continuously flowing said intermixed and dispersed liquid hydrocarbon and aqueous phases and insoluble dispersed catalyst through said reaction zone from said inlet end thereof toward said outlet end while said oxidation and removal of said sulfur compounds is effected in said reaction zone, maintaining in said reaction zone substantially less agitation than in said mixing zone but sufficient for preventing separation of said hydrocarbon and aqueous phases yet insufficient for effecting undesired intermixing of newly entered hydrocarbon adjacent said inlet end of said reaction zone with treated hydrocarbon adjacent said outlet end of said reaction zone, continuously withdrawing from said outlet end of said reaction zone said mixture of liquid hydrocarbon and aqueous phases, separating said treated liquid hydrocarbon from said aqueous phase and said dispersed catalyst in a decantation zone, and withdrawing said aqueous phase and dispersed catalyst therein from said decantation zone for recycling into said mixing zone for treatment of a subsequent quantity of liquid hydrocarbon phase.

2. In a method for the continuous flow treatment of a liquid hydrocarbon phase with an aqueous alkaline phase immiscible therewith and including a dispersed oxidation catalyst insoluble in both said aqueous phase and said hydrocarbon phase for the oxidation and removal of sulfur compounds in said liquid hydrocarbons, the steps which comprise continuously introducing said liquid hydrocarbon phase and said aqueous phase with said insoluble catalyst dispersed therein into a mixing zone, subjecting said liquid hydrocarbon and aqueous phases to agitation in said mixing zone for the intimate dispersal and intermixture thereof, continuously withdrawing said mixture and dispersion from said mixing zone into a reaction zone having an inlet end and an outlet end, continuously flowing said intermixed and dispersed liquid hydrocarbon and aqueous phases and insoluble dispersed catalyst through said reaction zone from said inlet end thereof toward said outlet end while said oxidation and removal of said sulfur compounds is effected in said reaction zone, maintaining the flow rate of said hydrocarbon and aqueous phases through said reaction zone at about 0.05 cm./sec. and 0.25 cm./sec. for preventing separation of said immiscible phases and undesired admixture of newly entered hydrocarbon adjacent said inlet end of said reaction zone, continuously withdrawing from said outlet end of said reaction zone said mixture of liquid hydrocarbon and aqueous and dispersed insoluble phases, separating said treated liquid hydrocarbon from said aqueous phase and said dispersed catalyst in a decantation zone, and withdrawing said aqueous phase and dispersed catalyst therein from said decantation zone for re-cycling into said mixing zone for treatment of a subsequent quantity of liquid hydrocarbon phase.

3. In a method for the continuous flow treatment of a liquid hydrocarbon phase with an aqueous alkaline phase immiscible therewith and including a dispersed oxidation catalyst insoluble in both said aqueous phase and said hydrocarbon phase for the oxidation and removal of sulfur compounds in said liquid hydrocarbons, the steps which comprise continuously introducing said liquid hydrocarbon phase and said aqueous phase with said insoluble catalyst dispersed therein into a mixing zone, subjecting said liquid hydrocarbon and aqueous and catalyst phases to agitation in said mixing zone for the intimate dispersal and intermixture thereof, continuously withdrawing said mixture from said mixing zone into a reaction zone having an inlet end and an outlet end, continuously flowing said intermixed and dispersed and liquid hydrocarbon and aqueous phases and catalyst through said reaction zone from said inlet end thereof toward said outlet end while said oxidation and removal of said sulfur compounds is effected in said reaction zone, maintaining in said reaction zone substantially less agitation than in said mixing but sufficient for preventing separation of said hydrocarbon and aqueous and catalyst phases yet insufficient for effecting undesired intermixing of newly entered hydrocarbon adjacent said inlet end of said reaction zone with treated hydrocarbon adjacent said outlet end of said reaction zone, continuously withdrawing from said outlet end of said reaction zone said mixture of dispersed liquid hydrocarbon and aqueous phases into a decantation zone, continuously flowing said mixture of hydrocarbon and aqueous phases through said decantation zone at a flow rate of less than the flow rate through said reaction zone and less than about 0.05 cm./sec. effecting separation in said decantation zone of said treated hydrocarbon phase from said aqueous phase and said dispersed catalyst therein, withdrawing from said decantation zone said separated and treated hydrocarbon phase, and separately withdrawing from said decantation zone said aqueous phase including said dispersed catalyst for re-cycling into said mixing zone for treatment of a subsequent quantity of liquid hydrocarbon phase.

References Cited by the Examiner
UNITED STATES PATENTS

| | | | |
|---|---|---|---|
| 2,727,849 | 12/55 | Napper | 208—204 |
| 2,739,101 | 3/56 | Gordon et al. | 208—204 |
| 2,893,851 | 7/59 | Georgian | 23—288.3 |
| 2,893,954 | 7/59 | Ten Have et al. | 208—204 |
| 2,897,140 | 7/59 | Gislon et al. | 208—204 |
| 3,038,855 | 6/62 | Weisang et al. | 208—203 |

ALPHONSO D. SULLIVAN, *Primary Examiner.*